Feb. 2, 1965  J. L. ANECKI  3,167,892

SHAFT MOUNTING ARRANGEMENT

Filed June 5, 1961

Inventor
Josef Longin Anecki
By Dowell & Dowell
Attorneys

United States Patent Office 3,167,892
Patented Feb. 2, 1965

3,167,892
SHAFT MOUNTING ARRANGEMENT
Josef Longin Anecki, Slough, England, assignor to Lan-Elec Limited, Slough, England, a company of Great Britain
Filed June 5, 1961, Ser. No. 115,000
Claims priority, application Great Britain, June 7, 1960, 19,997/60
5 Claims. (Cl. 51—168)

This invention relates to the mounting of shafts in housings, especially where the housing is in the form of a sleeve providing a bearing in which the shaft rotates.

In a common arrangement, an idler shaft carrying a work-performing wheel, for example a grinding wheel, at one end passes through the whole length of a housing sleeve and is retained by means of a locking spring received on a tail spigot at the other end of the shaft, or in a groove therein, and bearing against the end of the sleeve to restrain axial movement of that end of the shaft into the sleeve.

Such an assembly works quite well but suffers from the disadvantage that it is very easy for the spring to become lost when the shaft is withdrawn from the sleeve for maintenance, cleaning or some other purpose.

Thus for example, in the case of a shaft carrying a grinding wheel forming the sharpener for the knife of a food slicing machine, it is necessary for the user to remove the assembly of shaft and wheel from its housing sleeve quite frequently, for cleaning and also occasionally for replacement of the abrasive.

In accordance with the invention the above-mentioned difficulty is overcome by an assembly wherein the shaft is held in position in the housing against unintended displacement by a retaining spring of generally circular configuration which is lodged within an annular recess in the inner wall of the housing and is compressed by the housing on to the shaft, the arrangement being such that the spring remains in position in the housing when the shaft is withdrawn from and replaced in the housing.

The shaft can have a tail spigot that is tapered in opposite directions from a position intermediate its ends where it is of maximum diameter, and the spring engage the spigot at a position close up to where it joins the main body of the shaft. A convenient form of spring comprises a curved part that falls short of being a complete circle and has at its extremities a pair of substantially parallel inturned legs that engage one on either side of the spigot.

In order that the invention may be better understood an assembly in accordance with it, by which a grinding wheel can be mounted on the frame of a food cutting machine, will be described by way of example only, with reference to the drawing accompanying the provisional specification in which.

Figure 1:
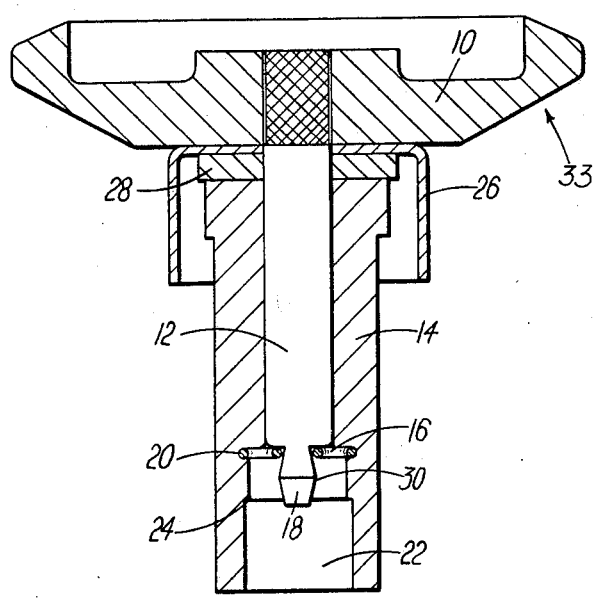
FIGURE 1 is a view of the assembly in longitudinal section.

FIGURE 1 of the drawing shows an assembly of a grinding wheel 10 mounted on one end of an idler shaft 12 having a tail spigot 18 at its other end. The shaft 12 is received within a housing sleeve 14 for rotation and is retained within the sleeve by a retaining spring 16 which is compressed on to the tail spigot 18 at a location close up to where the spigot joins the main body of the shaft. The spigot 18 has two portions of frusto-conical form that taper in opposite directions from a position 30 intermediate its ends where it is of maximum diameter.

Figure 2:
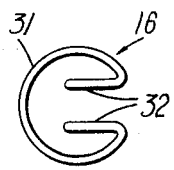
FIGURE 2 shows the configuration of the retaining spring.

The spring 16, which is of generally circular configuration, is retained within the housing sleeve 14 by being received in an annular groove 20 machined in the inner wall of the sleeve 14. As can be seen in FIGURE 2, the spring consists of a length of spring wire that has a curved portion 31 that falls somewhat short of being a complete circle and is provided at its extremities with two internal substantially parallel legs 32 to lie one on either side of the tail spigot 18 and grip it.

To facilitate the initial fitting of the spring the sleeve 14 is counterbored at 22 so that the spring can be inserted therein and confined before it has to be compressed to pass the shoulder 24 thus formed in the sleeve bore.

In use it is possible to remove and refit the assembly 10, 12, without difficulty and without displacing the spring 16, merely by forcing the maximum diameter portion or hump 30 of the tail spigot 18 through the spring. The spring cannot be lost because it never leaves the housing 14.

In the particular assembly under consideration cleanliness is important and there is accordingly provided a cylindrical screen 26 of rubber or metal to exclude dust and food particles from the crevice between the wheel 10 and a friction-reducing plastic or metal washer 28 carried at the upper end of the sleeve 14.

The invention has been described in its application to the mounting of a grinding wheel, but is equally applicable to the mounting of any shaft where ease of removal and replacement is required. Another specific example is in the mounting of a honing wheel on the frame of the same machine as embodies the above-described grinding wheel. Whereas the latter is applied to the food-cutting knife by pushing it toward the knife, the honing wheel on the other hand is applied by pulling it into contact with the knife, that is to say when the honing wheel is doing work there is a force along the shaft tending to draw it from the housing sleeve in an upward direction, considering the parts as viewed in FIGURE 1. Thus if the wheel in FIGURE 1 were a honing wheel it would have a working annular surface at its underside as indicated by the arrow 33. Therefore in the case of the mounting of a honing wheel the stiffness of the retaining spring 16 can be chosen so as to set a limit to the force with which the stone can be drawn against the knife, thereby protecting the knife and stone from a careless operator.

I claim:

1. In rotary machinery, the combination of a non-rotary bearing sleeve and a shaft journalled for rotation therein, and a radially resilient bent wire spring member captive in and contiguous with said non-rotary bearing sleeve and having an internal through aperture, the shaft being profiled at one end into a tail spigot which is of a maximum diameter at a position intermediate its ends, said spigot having inner and outer portions of frusto-conical form respectively inwardly and outwardly of said position of maximum diameter and being adapted to enter said internal aperture of said resilient member to wedge outwardly opposed portions of said member until the maximum diameter has passed through the aperture so that said resilient member seats on said inner frusto-conical portion and holds the shaft captive against axial movements under normal forces in operation while permitting it to rotate relatively to said resilient member and said sleeve.

2. The combination according to claim 1, and wherein the shaft has at its end remote from the end formed with the spigot, means for securing a working head to the shaft.

3. The combination according to claim 2, wherein the working head has a working annular surface that faces generally toward the spigoted end of the shaft.

4. In rotary machinery, the combination of a bearing sleeve and a shaft journalled for rotation therein, and a radially resilient member in the form of a wire spring having the configuration of an incomplete ring greater than a semicircle with two substantially parallel chordal inturned legs forming extensions of the ends thereof, the bearing sleeve being internally grooved to receive the incomplete ring of the spring and thereby hold the spring captive, and the shaft having one end profiled into a double-tapered tail spigot, said tail spigot entering between said spring legs and passing therebetween whilst splaying the legs apart until the legs have passed beyond a maximum diameter part of said tail spigot to thereby retain the shaft axially.

5. The combination according to claim 4, and wherein the radially resilient member and the tail spigot retain the shaft axially under normal forces in operation but cooperate to release the shaft by yielding of the spring legs upon occurrence of a predetermined axial pull from the end of the shaft opposite said spigot.

References Cited by the Examiner

UNITED STATES PATENTS

| | | | |
|---|---|---|---|
| 543,628 | 7/95 | Marsh | 24—218 |
| 965,131 | 7/10 | Bliss | 51—168 |
| 1,052,077 | 2/13 | McMillan | 279—46 |
| 2,385,565 | 9/45 | Cox | 24—218 |
| 2,496,352 | 2/50 | Metzger et al. | 51—209 |
| 2,762,083 | 9/56 | Noguera | 24—218 |
| 2,810,239 | 10/57 | Burleigh | 51—168 |

FOREIGN PATENTS 523,572   4/31   Germany.

LESTER M. SWINGLE, *Primary Examiner.*

MORRIS M. FRITZ, JOHN C. CHRISTIE, FRANK H. BRONAUGH, *Examiners.*